Dec. 27, 1932.  A. L. SMITH  1,892,015

WARM AIR HEATING SYSTEM

Filed Sept. 8, 1931  2 Sheets-Sheet 1

INVENTOR
*Arthur Leroy Smith*
BY
*Fred L. Matheny*
ATTORNEY

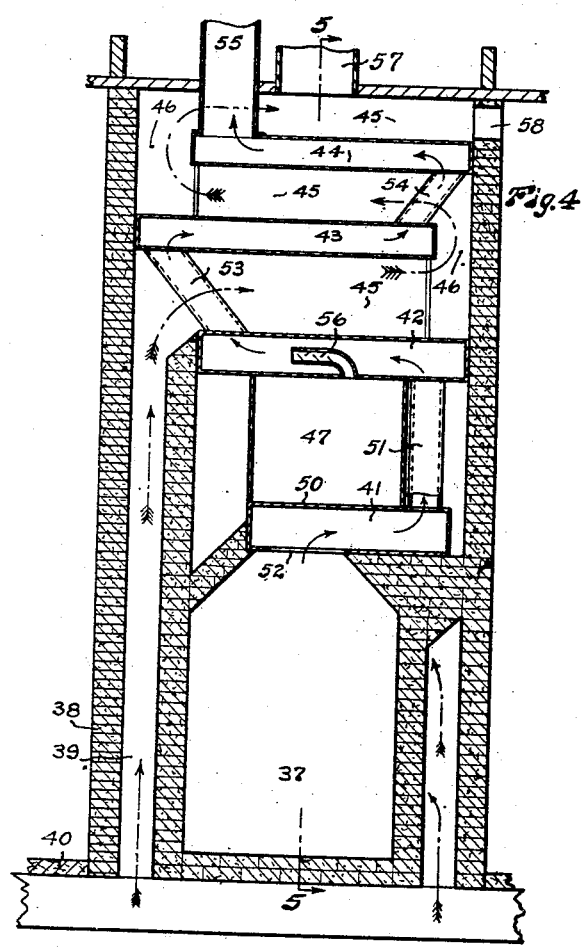
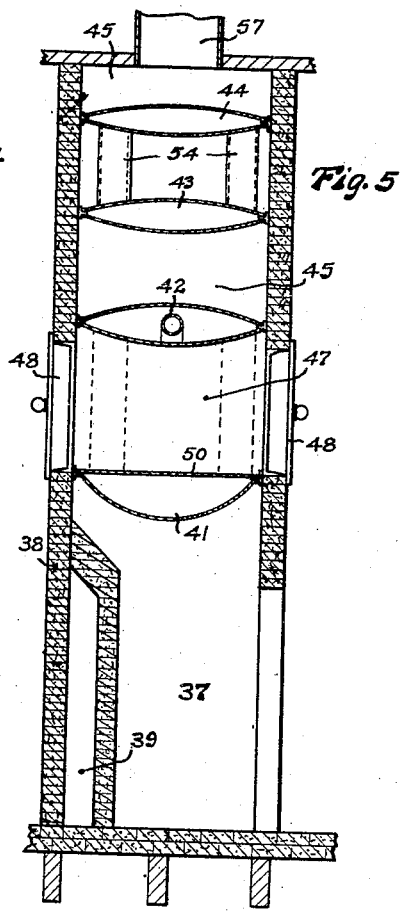
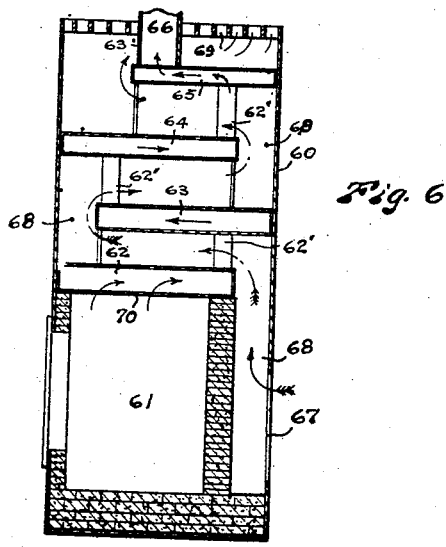

Patented Dec. 27, 1932

1,892,015

UNITED STATES PATENT OFFICE

ARTHUR LEROY SMITH, OF SEATTLE, WASHINGTON

WARM AIR HEATING SYSTEM

Application filed September 8, 1931. Serial No. 561,561.

My invention relates to improvements in heating systems of the so called warm air type and the general object of my invention is to increase the heating efficiency of systems of this class. In general, efficiency as applied to a heating system is the ratio of the amount of heat energy usefully applied to the total heat energy contained in the fuel.

Another important object of my invention is to provide a warm air type heating system in which the heated products of combustion are caused to travel back and forth within a heating compartment in substantially horizontal conduits for a relatively long distance before discharging into the flue and in which the arrangement of said conduits is such that the air to be warmed is caused to travel back and forth in a similar manner in contact with the exterior of the hot gas conduits whereby a maximum amount of heat will be extracted from the hot gases before they pass out into the smoke discharge pipe.

Another important object of my invention is to provide a heating unit as a furnace, stove or fireplace embodying a housing having relatively flat conduits for heated gases which conduits are spaced apart vertically to afford substantially horizontal warm air passageways positioned one above another, the alternate ends of said gas conduits terminating short of the end walls of the housing to afford openings connecting adjacent warm air passageways whereby air which is admitted near the bottom of the housing will be caused to travel a relatively long distance back and forth from one end of the housing to the other in contact with said hot gas conduits before it is discharged whereby substantially all of the heat will be extracted from said heated gases and maximum heating of the air will be obtained.

Other objects are to provide a heating unit which is simple in construction, economical in the amount of floor space used, which may be used in very low basements or placed on the floor level where there is no basement; which is not expensive to construct, easy to install, easy to clean if it becomes loaded with soot, and highly efficient in operation.

Another object is to provide an improved heat pick up system which may be incorporated into a hot air furnace or a stove or a fireplace.

A further object is to provide a heating unit of this nature in which the passageways for heated gases are of gradually decreasing area and the passageways for warm air are of gradually increasing size from bottom to top of the furnace whereby substantially uniform velocity of both the gases and the air is maintained.

Other and more specific objects will be apparent from the following description taken in connection with the accompanying drawings.

In the drawings Figure 1 is a longitudinal vertical mid section of a furnace constructed in accordance with my invention.

Figs. 2 and 3 are cross sections of the same substantially on broken lines 2—2 and 3—3 of Fig. 1.

Figs. 4 and 5 are vertical sectional views of a fireplace constructed in accordance with my invention.

Fig. 6 is a vertical sectional view of a stove or heater constructed in accordance with my invention.

Like reference numerals designate like parts throughout the several views.

In the ordinary warm air furnace or stove or fireplace the heated products of combustion ordinarily travel through vertical or substantially vertical passageways for a relatively short distance to the smoke pipe and are allowed to enter the smoke pipe before they are completely burned up and before they have given up all of their available heat. In the ordinary warm air furnace the air to be warmed is usually allowed to pass upwardly a relatively short distance through a larger passageway over the heated surfaces and does not have an opportunity to pick up all of the available heat. This results in low efficiency through failure to extract the maximum amount of heat from said burning gases before they are discharged into the smoke pipe and through failure to bring all of the air into contact with the heated surfaces and pick up all available heat.

I overcome these objectionable features by providing relatively long, substantially horizontal conduits for the heated gases to travel through before they enter the smoke discharge pipe and by placing these conduits in such a manner as to provide a relatively long passageway through which the air to be warmed must travel for a relatively long distance in direct contact with said conduits to thereby pick up the maximum amount of available heat.

Figure 1:
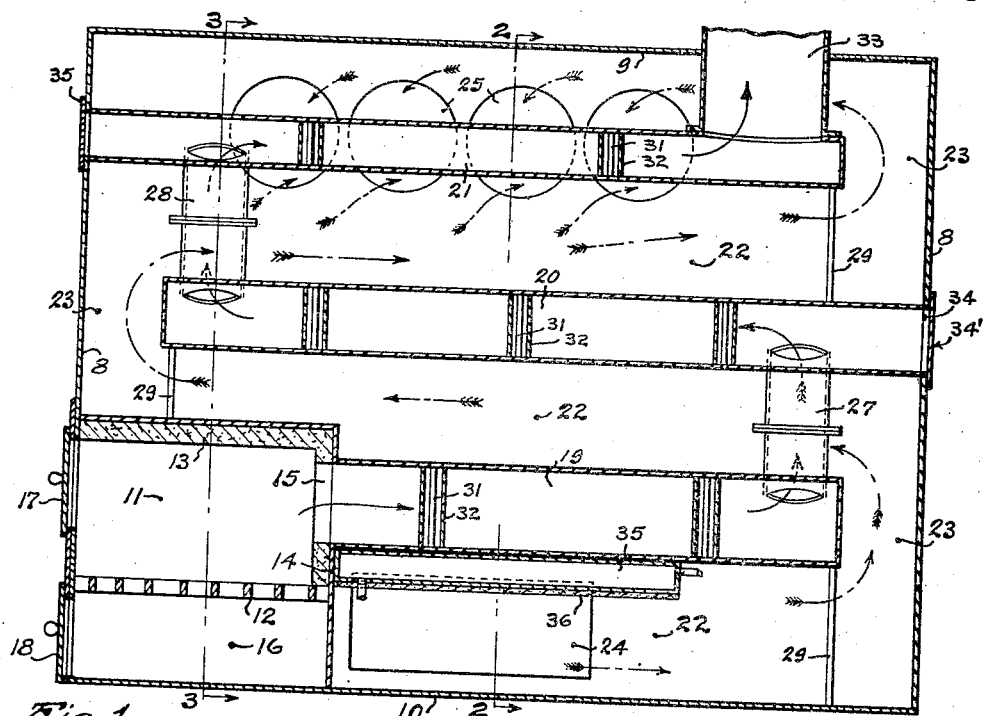
Figure 2:
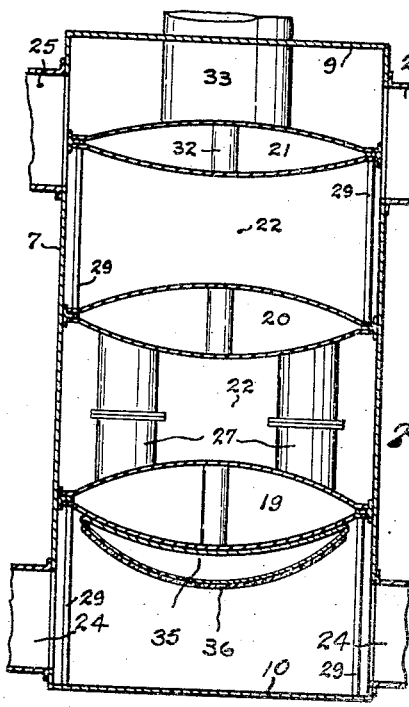
Figure 3:
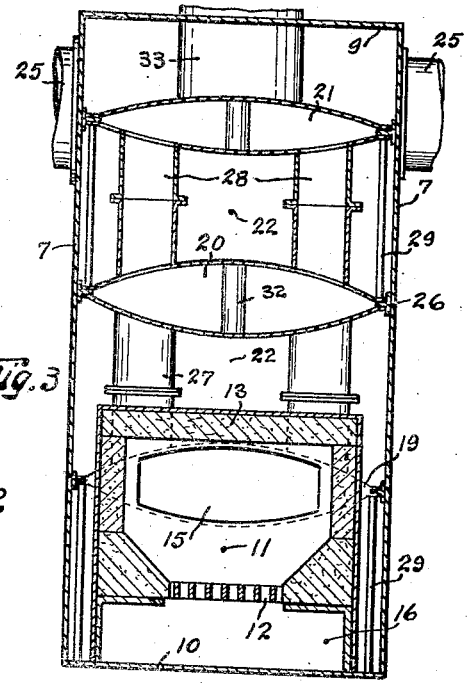

In the embodiment of my invention as applied to a furnace illustrated in Figs. 1, 2 and 3, I provide a relatively long narrow upright rectangular housing composed of side walls 7, end walls 8 and top and bottom walls 9 and 10 respectively.

Within the lower portion of this furnace housing and near the front end I provide a fire box 11 having a grate 12, a top wall 13 and a rear wall 14. The rear wall 14 has a passageway 15 for the exit of heated products of combustion. An ash pit 16 is provided below the grate 12 and doors 17 and 18 afford access to the fire box 11 and ash pit 16 respectively.

The interior of the furnace housing is provided with a plurality of substantially horizontal oval shaped conduits 19, 20 and 21 disposed in spaced apart relation one above another in such a manner as to leave horizontal warm air passageways 22 therebetween, said conduits extending entirely across the furnace from one side wall 7 to the other. The ends of the conduits 19, 20, and 21 alternately terminate short of the end walls of the housing to leave openings 23 through which warm air may pass upwardly from one passageway 22 to the next. Three of the oval shaped conduits 19, 20 and 21 are shown in the drawings but obviously a greater or less number of said conduits may be used. One end of the lower conduit 17 registers with the opening 15 in the rear of the firebox whereby the heated gases, smoke and products of combustion may enter. The other end of this conduit 19 terminates short of the rear wall of the housing to leave the opening 23 through which warm air may pass into the next compartment above. The middle conduit 20 extends entirely to the rear wall but terminates short of the front wall of the housing and the top conduit extends entirely to the front wall but terminates short of the rear wall of the housing so that the air to be warmed is caused to travel back and forth from one end of the housing to the other. Air to be heated enters the lower part of the housing below the conduit 19, through cold air inlet openings 24 and leaves the upper part of the housing through warm air take off openings 25. The air is thus caused to follow a path back and forth across the housing between the oval shaped heated conduits 19, 20 and 21 and is brought into close contact with the external walls of said conduits for a long period of travel whereby it is caused to pick up a very large proportion of the heat of the gases which circulate within the conduits.

The conduits 19, 20 and 21 are preferably of oval shape, as shown in Figs. 2 and 3, and extend throughout the entire transverse width of the inside of the housing from one side wall 7 to the other. These conduits may be formed of upper and lower metal plates curved in crosswise directions, disposed with their concave sides toward each other and having their edges secured, as by welding, to bars 26 of T shaped cross section. The bars 26 strengthen the construction and form convenient means for attaching the sides 7 of the furnace housing to.

The conduits 19 and 20 are connected with each other by two upright pipes 27, while the conduits 20 and 21 are similarly connected with each other by two other upright pipes 28. If desired, the pipes 27 and 28 may be inclined as are corresponding pipes which are shown in Fig. 4, thus making the connections of the upper ends of the pipes 27 and 28 nearer to the ends of the conduits with which their said upper ends communicate. The two upright pipes 27 are spaced apart as shown in Figs. 2 and 3 and the two pipes 28 are similarly spaced whereby the heated gases will enter near the narrower sides of the conduits 20 and 21 and will be more evenly distributed as respects the heating area thereof. The pipes 27 and 28 also serve as supporting means for the upper conduits with which they are connected. Other supports or legs 29 are provided for the ends of the conduits which are not supported by the pipes 27 and 28 whereby the firebox 11 and conduits 19, 20 and 21 are self supporting independently of the furnace housing walls.

Spacers, preferably in the nature of posts 31 surrounded by larger pipes 32, are provided in the conduits 19, 20 and 21 to maintain the proper spaced relation between the upper and lower walls of each conduit member. The posts 31 may be riveted at the ends, to the respective conduit walls. The pipes 32 protect the posts from direct contact of the heated gases.

A smoke discharge pipe 33 is connected with the discharge end of the uppermost conduit 21.

The warm air take off conduits 25 are preferably connected with the sides 7 of the furnace housing at a proper location to take the warm air partly from above and partly from below the uppermost heater conduit 21. I find that I am able to take off substantially equal amounts of warm air in each of the several pipes where this arrangement of the warm air take off pipes is used.

Due to the fact that the heated gases will contract and be reduced in volume as the cooling of such gases proceeds I find it desirable to make the conduits 19, 20 and 21 of successively reduced cross sectional areas from bottom to top of the furnace so that a substantially constant velocity of these gases will be maintained. It will be noted in the drawings that the cross sectional area of the lower conduit 19 is the greatest, that the cross sectional area of the conduit 20 is less than that of conduit 19 and that the cross sectional area of the upper conduit 21 is less than that of conduit 20. While the heated gases are cooling and contracting during their upward travel, the reverse will be true of the air which is being warmed and is expanding. For this reason I find it desirable to make the passageways 22 through which this air travels, of successively increasing cross sectional area from bottom to top of the housing. This maintains a substantially constant velocity of the air.

The respective ends of the conduits 20 and 21 which abut against the end walls 8 of the housing preferably have clean cut openings 34 which are closed by readily removable plates 34' whereby these conduits may be quickly and easily cleaned out. The lower conduit 19 may be cleaned by suitable means inserted through the fire box 11.

35 is a water heater or jacket preferably of crescent like cross sectional shape so as to conform to the shape of the lower side of the conduit 19. A covering 36 of heat insulating material, as asbestos, is preferably provided on the bottom of the water heater 35. The water heater 35 performs two functions, namely, it serves to heat water and it prevents too rapid an expansion of the air which is entering through the cold air inlet openings 24, which expansion, I have found may create an undesirable back pressure of air at this location.

In Figs. 4 and 5 I have shown my invention applied to a fireplace. In this adaptation 37 is the combustion chamber, 38 the fire brick walls, 39 is a cold air intake space which extends upwardly at both sides and preferably around the back of the combustion chamber 37. The cold air intake space may receive a supply of cold air from below a floor 40. A heat pick up chamber, disposed directly above the combustion chamber 37 has a plurality of substantially horizontal hot gas conduits 41, 42, 43 and 44 extending crosswise thereof in spaced relation to leave warm air passageways 45 therebetween and warm air passageways 46 at the ends thereof. An oven space 47 is preferably provided between the two lowermost hot gas conduits 41 and 42. This oven space may be accessible through doors 48 located in the firebrick walls 39. Either one or two of the doors 48 may be used, as the installation requires. If the fireplace is in a wall between two rooms then two oven doors may be desired. If the fireplace is in an outside wall only one oven door will ordinarily be required.

The lowermost hot gas conduit 41 may have a plane flat top side 50 which forms the bottom of the oven space and said conduit 41 is connected with the hot gas conduit 42 by pipes 51 which are positioned at the end of the oven space 47. Hot gases, smoke and by products of combustion from the fire box 38 enter the hot gas conduit 41 through an opening 52, thence pass upwardly through pipes 51 thence horizontally through conduit 42, thence upwardly through inclined pipes 53, thence horizontally through conduit 43, thence upwardly through inclined pipes 54 thence horizontally through conduit 44 and out through smoke pipe 55. By inclining the pipes 53 and 54 I am able to deliver the hot gases into the outer ends of hot gas conduits 43 and 45 thus utilizing the entire length of each of such conduits.

The oven space 47 preferably has a vent pipe 56 which extends upwardly into conduit 42 to permit the escape of fumes, vapor and the like from the oven.

The cool air passageway 39 delivers the cool air above the oven space into the passageway 45 between the conduits 42 and 43 and such cool air passes back and forth between conduits 42, 43 and 44 and is heated before passing outwardly through warm air take off pipes 57. Warm air take off means 58 may also be provided in the fireplace wall near the ceiling 59 of the room in which the fireplace is located. The operation of this fireplace, in so far as the travel of the heated gases and the air which is being warmed is concerned, is substantially the same as the operation of the furnace hereinbefore described.

In Fig. 6 I have shown my invention applied to a circulation type heater. In this heater 60 is a shell or housing, 61 is a firebox, 62, 63, 64 and 65 are substantially horizontal hot gas conduits which are connected with each other by pipes 62', 66 is a smoke pipe, 67 is an air intake opening, preferably in the rear side of the heater, 68 designates air circulation space for air which is to be warmed and 69 is an open work grill on the top of the heater through which the warmed air may discharge from the heater into the room. The heated gases from the firebox 61 enter the conduit 62 through an opening 70 and travel back and forth across the heater as they move upwardly and the air which is being heated is always in contact with the exterior of the hot gas conduits so that a very large proportion of the heat in the gases is picked up and high efficiency obtained.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a warm air heating unit, a housing, a fire box in the lower portion of said housing, a plurality of hot gas conduits in said housing in spaced apart relation one above another in contacting relation with the side walls of said housing, said conduits affording warm air passageways therebetween and leaving openings at alternate ends by which said warm air passageways communicate with each other, the interior of said hot gas conduits forming a continuous passageway for heated products of combustion, the lowermost hot gas conduit communicating with said firebox, a smoke pipe connected with the uppermost hot gas conduit and air inlet and air take off means connected with said warm air passageways.

2. In a warm air heating unit, a housing, a fire box in the lower portion of said housing, a plurality of hot gas conduits in said housing in spaced apart relation one above another in contacting relation with the side walls of said housing, said hot gas conduits affording warm air passageways therebetween and leaving openings at alternate ends through which said warm air passageways communicate with each other, cold air intake means connected with the lowermost warm air passageway, air take off means connected with said warm air passageways above said cold air intake means, upright conduit means extending through said warm air passageways and connecting said hot gas conduits with each other but leaving said warm air passageways open, the lowermost hot gas conduit being connected with said fire box, and a smoke pipe connected with the uppermost hot gas conduit.

3. The apparatus as claimed in claim 2 in which ends of the hot gas conduits have openings accessible from the interior of the housing and have removable caps closing said openings.

4. In a warm air heating unit, a housing, means forming connected warm air passageways extending back and forth in ascending relation across said housing, and a continuous hot gas conduit extending back and forth across said housing between said warm air passageways whereby air flowing through said passageway will be in continuous contact with said hot gas conduit, said hot gas conduit forming horizontal baffle means between said warm air passageways said baffle means being, in contacting relation with the side walls of said housing and being clear of the housing wall at alternate ends.

5. In a warm air heating unit, a rectangularly shaped housing, a fire box at one end of said housing near the bottom, a plurality of hot gas conduits of a width equal to the width of said housing extending lengthwise within said housing one above another in substantially horizontal spaced apart relation, pipes connecting said hot gas conduits with each other at alternate ends, the lowermost one of said hot gas conduits communicating at one end with said fire box, a smoke pipe connected with the uppermost conduit, said conduits constituting baffle walls and forming warm air passageways therebetween, through which air to be warmed may circulate in direct contact with the exterior of said conduits, the alternate ends of said conduits terminating short of the ends of the housing to leave openings connecting said warm air passageways, means for admitting cold air to the lowermost warm air passageway and means for taking off heated air from a location above said cold air inlet.

6. In a warm air heating unit, a housing, a fire box in the lower portion of said housing, a plurality of relatively flat hot gas conduits disposed within said housing in spaced apart relation one above another and in contacting relation with the side walls of said housing, alternate ends of said hot gas conduits terminating short of the walls of said housing whereby a continuous passageway for air to be warmed will be formed between said hot gas conduits and past the ends of said hot gas conduits, pipes connecting said hot gas conduits with each other near the ends thereof whereby heated gases may flow through said hot gas conduits and said pipes, the lowermost hot gas conduit being connected with said firebox, a smoke pipe connected with the uppermost hot gas conduit, means for admitting air to the lower portion of said housing, and warm air take off means connected with the upper portion of said housing.

7. In a warm air heating unit, a housing, a fire box in the lower portion of said housing, a plurality of relatively flat hot gas conduits disposed within said housing in spaced apart relation one above another and in contacting relation with the side walls of said housing, alternate ends of said hot gas conduits terminating short of the walls of said housing whereby a continuous passageway for air to be warmed will be formed between said hot gas conduits and past the ends of said hot gas conduits, the lowermost hot gas conduit being of larger and the successive hot gas conduits thereabove being of successively smaller cross sectional areas.

8. In a warm air heating unit, a housing, a fire box in the lower portion of said housing, a plurality of relatively flat hot gas conduits disposed within said housing in spaced apart relation one above another and in contacting relation with the side walls of said housing, alternate ends of said hot gas conduits terminating short of the walls of said housing whereby a continuous passageway for air to be warmed will be formed between said hot gas conduits and past the ends of said hot gas conduits, said hot gas conduits being of successively decreasing cross sectional area from the lowermost hot gas conduit upwardly and said warm air passageways being of successively increasing cross sectional areas from the lowermost warm air passageway upwardly.

9. In a warm air heating unit, a housing, a fire box in the lower portion of said housing, a plurality of relatively flat hot gas conduits disposed within said housing in spaced apart relation one above another and in contacting relation with the side walls of said housing, alternate ends of said hot gas conduits terminating short of the walls of said housing whereby a continuous passageway for air to be warmed will be formed between said hot gas conduits and past the ends of said hot gas conduits, pipes connecting said hot gas conduits with each other near the ends thereof whereby heated gases may flow through said hot gas conduits and said pipes, the lowermost hot gas conduit being connected with said firebox, a smoke pipe connected with the uppermost hot gas conduit, an oven disposed between the two lowermost hot gas conduits, means for admitting air to the warm air passageway above said oven and warm air outlet means at the upper end of said housing.

10. The apparatus as claimed in claim 9 in which the heating unit is in the form of a fireplace extending from floor to ceiling and in which the hot gas conduits and warm air passageways are disposed within the space directly above the fire box.

The foregoing specification signed at Seattle, Wash., this 31st day of August, 1931.

ARTHUR LEROY SMITH.